(12) United States Patent
Wei et al.

(10) Patent No.: US 10,725,997 B1
(45) Date of Patent: Jul. 28, 2020

(54) METHOD AND SYSTEMS FOR CONCURRENT COLLECTION AND GENERATION OF SHARED DATA

(75) Inventors: Shu-Shang Sam Wei, Danville, CA (US); Raghavendra A. Rao, Bangalore (IN); Shuaib Hasan Khwaja, Pleasanton, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 102 days.

(21) Appl. No.: 13/525,458

(22) Filed: Jun. 18, 2012

(51) Int. Cl.
*G06F 16/23* (2019.01)
*G06F 16/176* (2019.01)
*G06F 9/46* (2006.01)

(52) U.S. Cl.
CPC .......... *G06F 16/2336* (2019.01); *G06F 9/466* (2013.01); *G06F 16/176* (2019.01)

(58) Field of Classification Search
CPC ............. G06F 17/30091; G06F 16/176; G06F 16/1767; G06F 16/1774; G06F 16/2336; G06F 16/2308; G06F 9/466
USPC ......................................... 707/781, 687, 704
See application file for complete search history.

(56) References Cited

U.S. PATENT DOCUMENTS

| 5,473,756 | A | * | 12/1995 | Traylor | G06F 5/12 365/189.12 |
|---|---|---|---|---|---|
| 5,544,353 | A | * | 8/1996 | Forman et al. | |
| 5,717,954 | A | * | 2/1998 | Grieff | G06F 5/06 710/52 |
| 5,867,734 | A | * | 2/1999 | Drews | G06F 9/52 710/52 |
| 5,892,979 | A | * | 4/1999 | Shiraki | G06F 5/06 710/52 |
| 5,924,098 | A | * | 7/1999 | Kluge | G06F 9/52 |
| 6,304,924 | B1 | * | 10/2001 | Varma | G06F 8/458 370/412 |
| 6,360,219 | B1 | * | 3/2002 | Bretl | G06F 17/30958 |
| 6,523,060 | B1 | * | 2/2003 | Kao | G06F 5/06 370/413 |
| 6,615,214 | B1 | * | 9/2003 | Bird | G06F 8/433 707/684 |
| 6,636,874 | B1 | * | 10/2003 | Douceur et al. | |
| 6,687,859 | B2 | * | 2/2004 | Robsman | H04L 67/14 709/227 |
| 6,823,337 | B2 | * | 11/2004 | Armstrong et al. | 707/704 |
| 6,823,511 | B1 | * | 11/2004 | McKenney et al. | 718/102 |
| 6,910,212 | B2 | * | 6/2005 | Brenner | G06F 9/526 707/999.003 |
| 7,003,610 | B2 | * | 2/2006 | Yang | G06F 13/102 710/260 |
| 7,308,539 | B2 | * | 12/2007 | Fuhs et al. | 711/141 |
| 7,328,263 | B1 | * | 2/2008 | Sadjadi | G06F 9/526 707/999.008 |
| 7,342,936 | B2 | * | 3/2008 | Zhao | H04L 12/5602 370/395.1 |

(Continued)

*Primary Examiner* — Miranda Le
(74) *Attorney, Agent, or Firm* — Degrosits & Noah LLP; Todd A. Noah (57) ABSTRACT

A system and method for controlling concurrent access to a shared resource in a distributed computing environment. A first user writes new data to the shared resource, then checks to see if at least one concurrent session to access the shared resource is running. If so, then the system does not allow the removal of data out of the shared resource. If not, then older data may be removed from the shared resource to make room for the new data.

9 Claims, 7 Drawing Sheets

(56) References Cited

U.S. PATENT DOCUMENTS

| | | | | |
|---|---|---|---|---|
| 7,366,831 B2* | 4/2008 | Saha | G06F 5/14 | 711/110 |
| 7,380,073 B2* | 5/2008 | Shorb | G06F 9/526 | 711/152 |
| 7,536,428 B2* | 5/2009 | Erdogan et al. | | |
| 7,574,520 B1* | 8/2009 | Basu | H04L 12/5693 | 709/235 |
| 7,603,502 B2* | 10/2009 | Richter | G06F 9/526 | 710/200 |
| 7,653,791 B2* | 1/2010 | McKenney | G06F 9/526 | 711/150 |
| 7,739,418 B2* | 6/2010 | Elkington | G06F 3/061 | 370/412 |
| 7,836,228 B1* | 11/2010 | Moir | G06F 9/544 | 710/20 |
| 7,904,436 B2* | 3/2011 | McKenney | G06F 16/2329 | 707/704 |
| 7,930,401 B2* | 4/2011 | Castellucci | H04L 12/403 | 370/329 |
| 7,962,923 B2* | 6/2011 | Hopkins | G06F 9/52 | 719/320 |
| 8,103,779 B2* | 1/2012 | Belkin et al. | 709/227 | |
| 8,208,380 B1* | 6/2012 | Nachum | H04L 49/901 | 370/235 |
| 8,275,815 B2* | 9/2012 | Aronovich et al. | 707/826 | |
| 8,539,168 B2* | 9/2013 | Dice | G06F 9/526 | 707/704 |
| 8,543,743 B2* | 9/2013 | Eilebrecht | G06F 9/546 | 710/52 |
| 8,578,380 B1* | 11/2013 | Adams | G06F 9/526 | 718/100 |
| 8,607,249 B2* | 12/2013 | Otenko | G06F 9/52 | 719/314 |
| 8,713,221 B1* | 4/2014 | Agrawal | G06F 5/12 | 710/57 |
| 8,914,417 B2* | 12/2014 | Bryan | G06F 9/5033 | 707/801 |
| 8,930,333 B1* | 1/2015 | Prince | G06F 17/30 | 707/704 |
| 8,938,598 B2* | 1/2015 | Jones | G06F 9/52 | 711/170 |
| 8,959,173 B1* | 2/2015 | Robidoux | G06F 9/5088 | 709/201 |
| 9,032,160 B1* | 5/2015 | Natanzon | G06F 11/14 | 711/135 |
| 9,037,818 B2* | 5/2015 | Natanzon | G06F 11/1456 | 711/162 |
| 9,098,462 B1* | 8/2015 | McNicholl | G06F 13/1631 | |
| 9,098,525 B1* | 8/2015 | Mandic | G06F 17/30194 | |
| 9,256,521 B1* | 2/2016 | Lam | G06F 13/28 | |
| 9,262,554 B1* | 2/2016 | Bailey | G06F 17/30985 | |
| 9,417,881 B2* | 8/2016 | Jones | G06F 12/0223 | |
| 9,418,175 B2* | 8/2016 | Omara | G06F 17/30958 | |
| 2002/0059165 A1* | 5/2002 | Hersh | G06F 9/52 | |
| 2002/0083056 A1* | 6/2002 | Armstrong et al. | 707/8 | |
| 2002/0138706 A1* | 9/2002 | Hugly | G06F 9/52 | 711/163 |
| 2003/0005025 A1* | 1/2003 | Shavit | G06F 9/4843 | 718/102 |
| 2003/0145012 A1* | 7/2003 | Kurth | G06F 16/9024 | |
| 2004/0015504 A1* | 1/2004 | Ahad et al. | 707/100 | |
| 2004/0039895 A1* | 2/2004 | Wolrich | G06F 9/3004 | 712/200 |
| 2004/0240459 A1* | 12/2004 | Lo | H04L 49/90 | 370/412 |
| 2005/0050018 A1* | 3/2005 | Basso | G06F 17/30286 | |
| 2005/0071556 A1* | 3/2005 | Walton et al. | 711/114 | |
| 2006/0031839 A1* | 2/2006 | Kang | G06F 9/544 | 718/102 |
| 2006/0242644 A1* | 10/2006 | Blue | G06F 9/526 | 718/100 |
| 2006/0288008 A1* | 12/2006 | Bhattiprolu | G06F 17/30171 | |
| 2007/0094431 A1* | 4/2007 | Fachan | G06F 9/524 | 710/200 |
| 2009/0133023 A1* | 5/2009 | Li | G06F 9/546 | 718/102 |
| 2009/0204755 A1* | 8/2009 | Rushworth | G06F 9/526 | 711/110 |
| 2010/0242043 A1* | 9/2010 | Shorb | G06F 9/526 | 718/104 |
| 2011/0145827 A1* | 6/2011 | Song | G06F 7/78 | 718/102 |
| 2012/0124317 A1* | 5/2012 | Mirichigni | G11C 5/066 | 711/168 |
| 2012/0124449 A1* | 5/2012 | Mirichigni | G06F 11/1044 | 714/763 |
| 2012/0151110 A1* | 6/2012 | Pointon | G06F 9/526 | 710/200 |
| 2012/0222051 A1* | 8/2012 | Kakulamarri | G06F 9/544 | 719/328 |
| 2012/0311604 A1* | 12/2012 | Achterberg et al. | 718/107 | |
| 2013/0152221 A1* | 6/2013 | Yin | G06F 21/10 | 726/31 |
| 2013/0198480 A1* | 8/2013 | Jones | G06F 9/5016 | 711/170 |
| 2013/0219111 A1* | 8/2013 | Bolanowski | G06F 12/0246 | 711/103 |
| 2013/0246672 A1* | 9/2013 | Saputra | G06F 9/524 | 710/56 |

* cited by examiner

METHOD AND SYSTEMS FOR CONCURRENT COLLECTION AND GENERATION OF SHARED DATA

TECHNICAL FIELD

This disclosure relates generally to the field of database management, and more particularly, to apparatus and methods for concurrent session management.

BACKGROUND

In a distributed computing system having a content management system including a data repository, users (through client devices) establish sessions with the content management system in order to access the data repository for read and/or write operations. However, in systems where concurrent access to data resources is allowed, data errors can occur unless access by concurrent users to shared resources is controlled. For example, where one user is writing to the shared resource and another user is reading from the same shared resource, the state of the resource is in flux, and read access may be incomplete or inaccurate.

One prior solution for multiple users seeking access to a shared resource is to immediately block access to the data and then serialize the requests so that they are handled one at a time in the order received. While effective, this scheme can impact performance and potentially lead to deadlock or livelock in data operations.

Therefore, it would be desirable to provide a mechanism to allow concurrent access while still providing protection for the integrity of the data.

DETAILED DESCRIPTION

This disclosure describes methods and systems for concurrent collection and/or generation of shared information.

In a distributed computing system, concurrent access to a shared resource is controlled by a status indicator. For example, in a single reader system, a flag is set to TRUE to indicate concurrent access by the single reader. When the flag is FALSE, then there are no concurrent sessions. In a multiple reader system, a counter is incremented each time a new concurrent session is initiated and decremented each time a session is terminated and releases the shared resource. When the counter has a value of zero, there are no concurrent sessions.

Typically, a shared resource has a defined size, for example, as a linked list. In one embodiment, after a user writes new data to the shared resource (data push), the status indicator is checked to see if there are any concurrent sessions active. If so, then older data is not removed from the shared resource (data pop) to make room for the new data until such time as there are no more concurrent sessions for that resource. If there are no active concurrent sessions, then older data is removed and the resource returns to its fixed size.

1. Operating Environment

Figure 1:
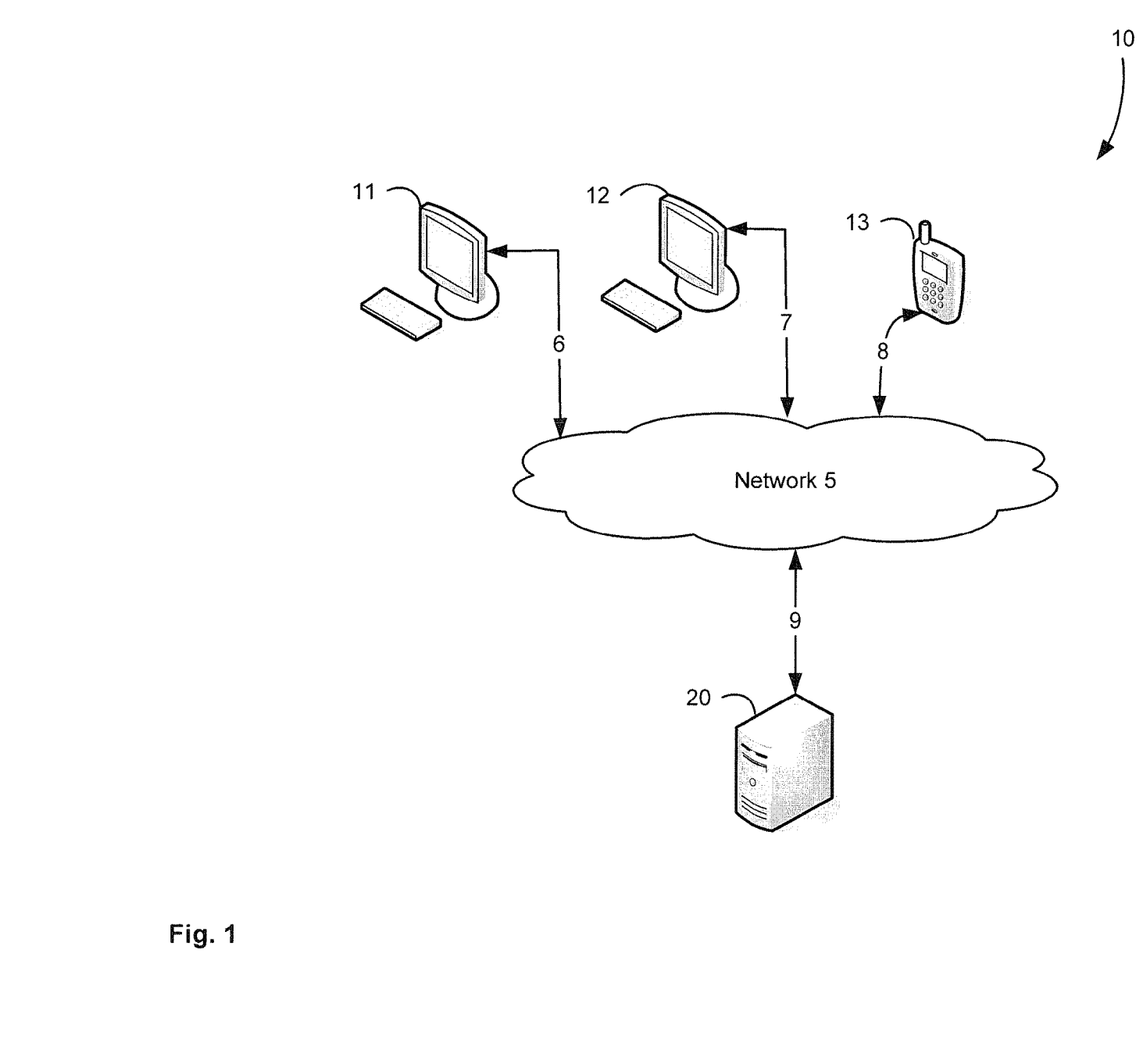
FIG. 1 is a block diagram illustrating a distributed computing system.

FIG. 1 is a simplified block diagram of a distributed computer network 10. Computer network 10 includes a number of client systems 11, 12, 13 coupled to a server system 20 via a communication network 5. Each of the client systems 11, 12, 13 and the server system 20 are coupled to the communication network 5 by communication links 6, 7, 8, 9, respectively. There may be any number of clients and servers in a system. Communication network 5 provides a mechanism for allowing the various components of distributed network 10 to communicate and exchange information with each other.

Communication network 5 may include many interconnected computer systems and communication links. Communication links 6, 7, 8, 9 may be hardwire links, optical links, satellite or other wireless communications links, wave propagation links, or any other mechanisms for communication of information, and may be the same or different for the various hardware components that are coupled to the network 5. Various communication protocols may be used to facilitate communication between the various systems shown in FIG. 1, including TCP/IP, HTTP protocols, wireless application protocol (WAP), vendor-specific protocols, customized protocols and others. In one embodiment, communication network 5 is the Internet, while in other embodiments, any suitable communication network may be used including a local area network (LAN), a wide area network (WAN), a wireless network, an intranet, a private network, a public network, a switched network, any combinations of these, and the like.

Distributed computer network 10 is merely one illustrative embodiment and is not intended to limit the scope of the disclosure. One of ordinary skill in the art would recognize many other variations, modifications and alternatives in how to effectively arrange such components and systems.

In a typical client/server arrangement as shown in FIG. 1, one or more client systems may request information from the server system, which responds to the client by providing the requested information. For this reason, a server system will typically have more computing and storage capacity than client systems, and indeed, the server system may be a gateway and content manager for providing access to content storage and related repository services as further described below. However, a particular computer system may act as either a client or a server depending on whether the computer system is requesting or providing information. Further, although aspects of the subject matter disclosed herein are described as using a client/server environment, it should be apparent that the subject matter may be embodied in other ways, for example, as a stand-alone computer system, or part of a cloud-computing environment.

Server system 20 receives requests for information from one or more of client systems 11, 12, 13 and performs processing in order to satisfy the requests, then forwards the resultant information back to the requesting client system. The processing required to satisfy the request may be performed by server system 20 or may alternatively be delegated to or obtained with the help of other servers connected to communication network 5 or to server system 20.

Client systems 11, 12, 13 enable users to access and query information stored or managed by server system 20. In one embodiment, a web browser application executing on a client system enables users to select, access, retrieve and/or query information stored or managed by server system 20. Examples of web browser programs include the Internet Explorer browser by Microsoft Corporation, the Firefox browser by Mozilla Foundation, and others.

Figure 2:
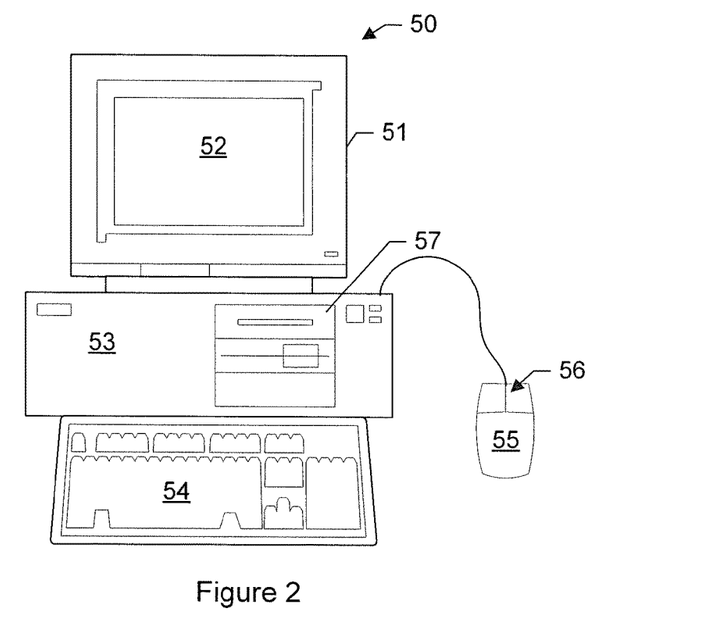
FIG. 2 is a front plan view of a computer workstation useful in the distributed computing system of FIG. 1.

FIG. 2 shows an exemplary computer workstation 50 that may serve as either a client or server system, including a monitor 51 with display screen 52, CPU cabinet 53, keyboard 54 and mouse 55 having one or more selection buttons 56. CPU cabinet 53 houses familiar computer components, such as mass storage devices 57, and other internal components which are not shown, such as a processor, memory, and the like, as further described with reference to FIG. 3 below.

Mass storage devices 57 may include disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on mass storage device 57. The source code of the software may also be stored or reside on mass storage device 57 (e.g., hard disk, magnetic disk, tape or CD-ROM). As a further example, software code may be transmitted via wires or radio waves, or downloaded through a network such as the Internet.

Figure 3:
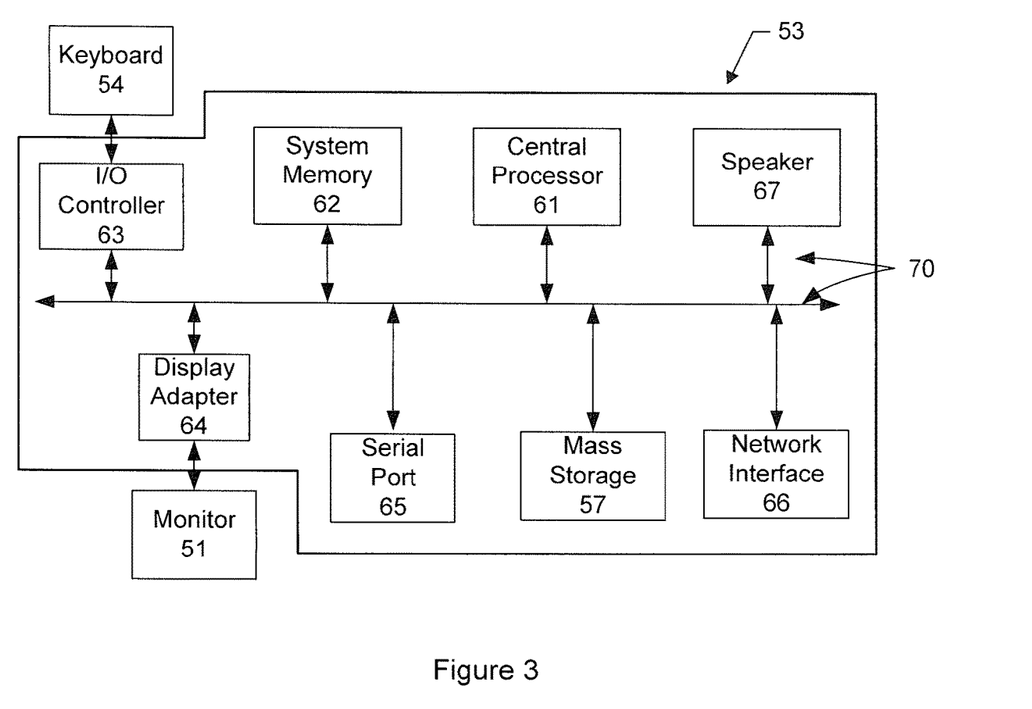
FIG. 3 is a block diagram of the components of the computer workstation of FIG. 2.

A system block diagram of the computer system/workstation 50 is shown in FIG. 3. The display monitor 51, keyboard 54 and storage devices 57 are as shown in FIG. 2. The CPU cabinet 53 contains key components such as central processor 61, system memory 62, input/output (I/O) controller 63, display adapter 64, serial or universal serial bus (USB) port 65, network interface 66, and speaker 67. In other embodiments, a computer system may include more or fewer components and/or subsystems. For one example, a computer system could include more than one processor (i.e., a multiprocessor system) or a system may include a cache memory.

The system bus 70 of computer system 50 are exemplary of an interconnection scheme serving to link the subsystems. For example, speaker 67 could be connected to the other subsystems through a port or have an internal direct connection to central processor 61. The processor 61 may include multiple processors or a multi-core processor, which may permit parallel processing of information. Computer system 50 is only one example of a suitable computer system. Other configurations of components and/or subsystems suitable for use with the methods described herein will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

The computer system 50 runs an operating system (OS) to manage hardware resources and provide common application services for application software. As an example, the computer 50 may run a Microsoft Windows® operating system (e.g., Windows NT, Windows XP, Windows Vista, Windows 7, Windows CE, Windows Mobile), or Linux, UNIX, Sun OS, Solaris, Mac OS X, Alpha OS, AIX, IRIX32, or IRIX64. Other operating systems may also be used.

2. Content Management Platform

Figure 4:
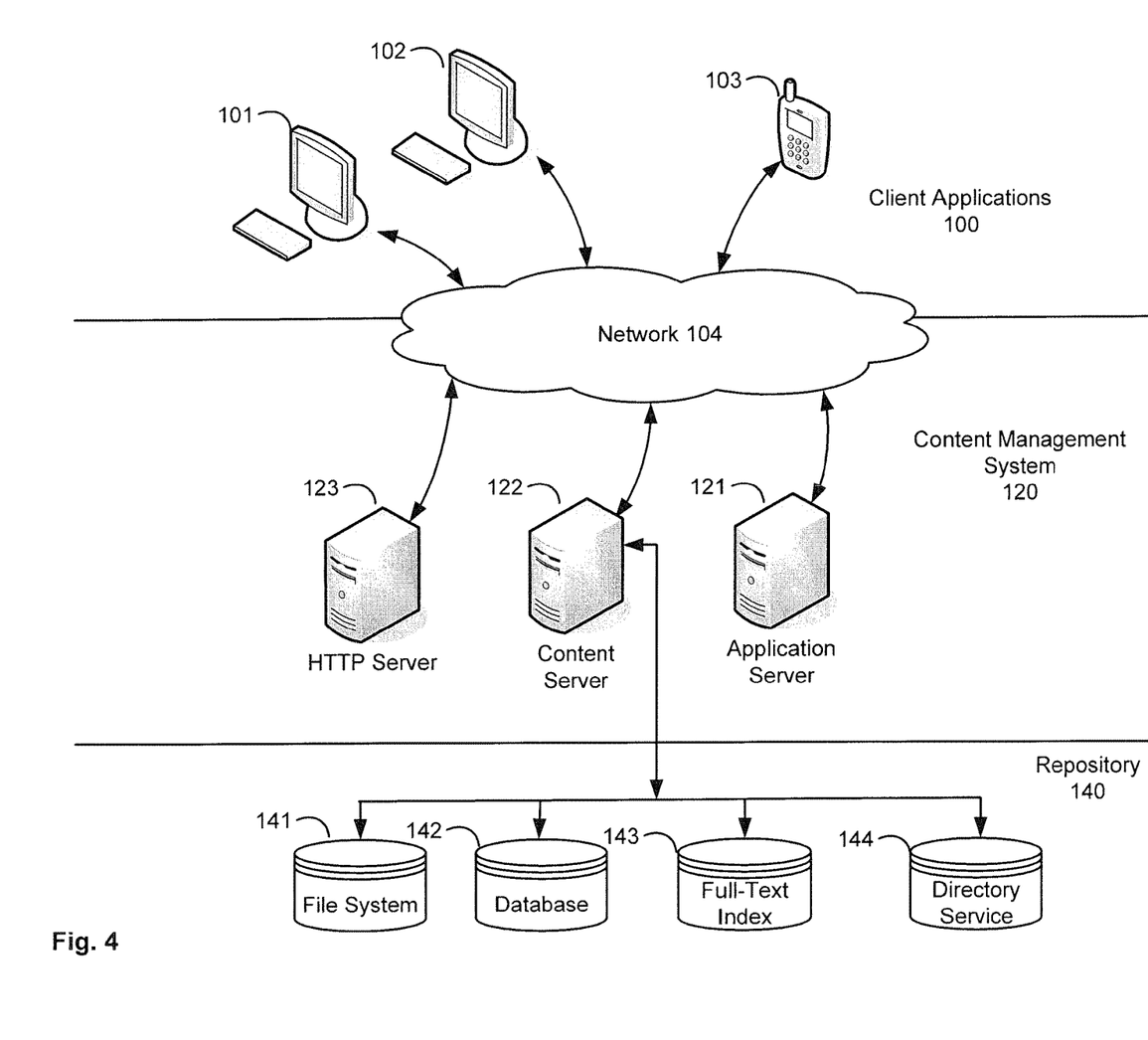
FIG. 4 is a block diagram illustrating the basic structure of an enterprise content management system.

FIG. 4 illustrates a more detailed embodiment of a distributed client/server system that provides an enterprise-level content management and repository service. A repository system 140 is operated and managed by a content management system 120, which in turn provides access to the repository for client applications 100.

The client applications 100 originate from client devices, such as devices 101, 102, 103, which communicate through a network 104 with an application server 121 in order to use one or more applications hosted on the application server. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop or laptop computer, iPhone® or other smart hand-held device, or other.

The application server 121 hosts one or more applications running on a content management platform that provide access to repository 140 for clients hosted on content server 122, which is also accessible to clients via network 104. An HTTP server 123 is also coupled to the network 104 to provide an administrative terminal for system operators to perform system maintenance, logging, access control, etc.

The repository 140 is provided for use by client applications 100, through the content server 122, which is accessible to the client devices through a network 104. The repository 140 may include a file store 141 for storing content items, a relational database 142 for storing attributes/metadata associated with the content items, a full-text index store 143 for the content items, and directory services 144.

A software platform runs on each of the various components, such as the EMC Documentum Platform software and related EMC Enterprise Content Management software, distributed by EMC Corporation, Hopkington, Mass. The Documentum Platform provides capabilities for managing enterprise content and is the foundation for related content management and case management product offerings.

Figure 5:
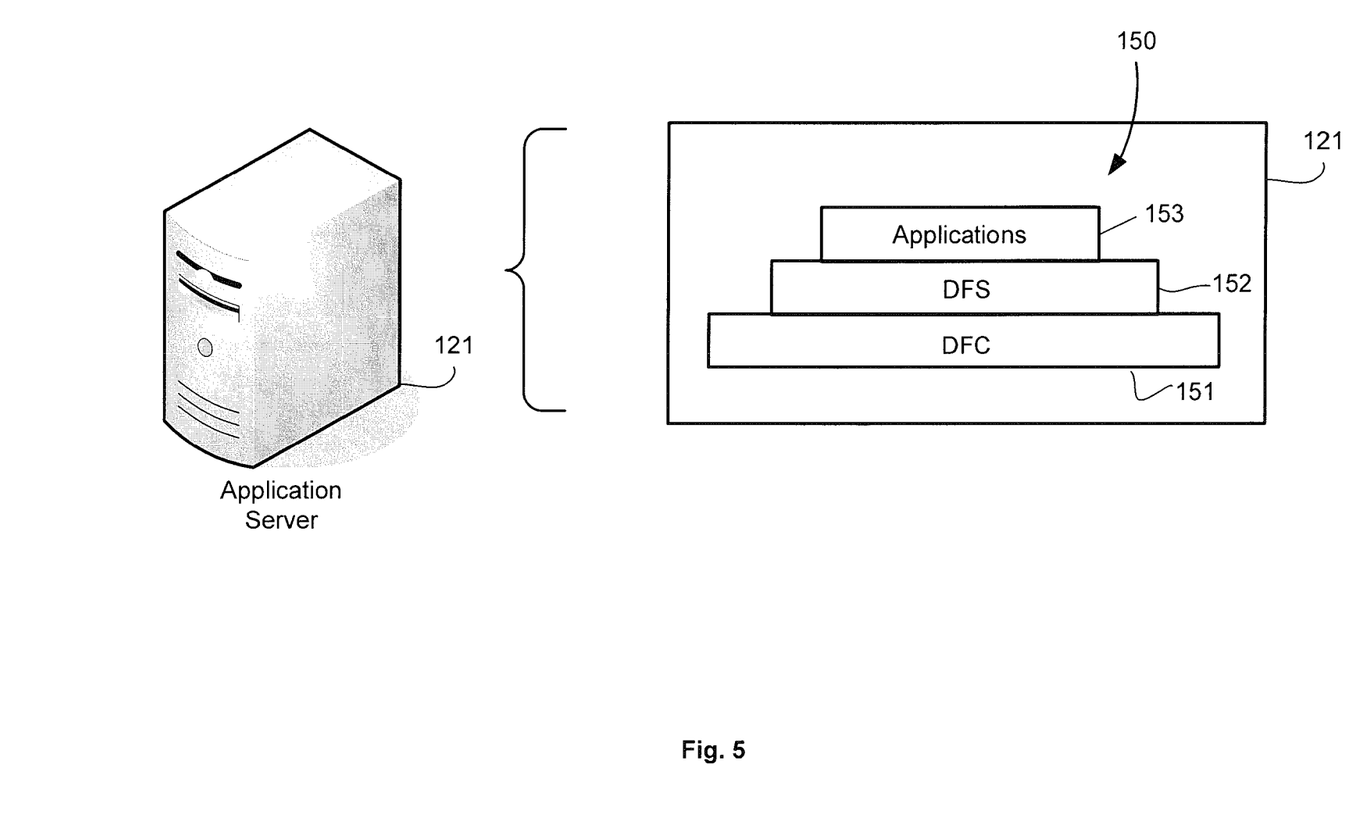
FIG. 5 is a block diagram illustrating the software framework implemented in a component of FIG. 1.

For example, FIG. 5 shows one simplified embodiment of the application server 121, which runs a content management framework 150 having a foundation layer 151, such as Documentum Foundation Classes (DFC), an interface layer 152, such as Documentum Foundation Services (DFS), and one or more applications on application layer 153 having integrated Documentum functionality through a Web Development Kit (WDK) or Webtop, for example. The HTTP server 123 runs a similar content management framework, for applications such as System Administrator or Intranet Client.

DFC is the programming interface for accessing the functionality of the Documentum platform through Java and COM class libraries and underlies all Documentum platforms. DFS is an SOA development framework and application programming interface (API), based on web services, and designed to support interoperable machine-to-machine interaction over a network. DFS is now the primary interface for most developers and users of the Documentum platform, although use the terms DFC and DFS are frequently (although incorrectly) used interchangeably.

Each of the clients 101, 102, 103 also runs a content management framework, with the API provided by the Documentum Client Library (DMCL), which is a linked library inside the client application (a DLL in Windows; a shared library in Unix). The DMCL takes documented API calls made by the client application and maps them to Server RPC functions that can be executed by the Content Server. Once the API call has arrived inside the Content Server, processing is no longer affected by the DMCL environment. In fact the DMCL thread that made the call will simply be sleeping awaiting the results of the processing from the server.

The Documentum platform also includes an extensible Business Objects Framework (BOF) which is built into DFC. BOF provides a useful framework and methodology for developing reusable business logic components called Business Objects that can be plugged into middle tier or client applications. More information about the Documentum Platform and related content management and case management product offerings can be found on the EMC website located at URL www.emc.com.

3. Session Management

A session is established between a client and the data repository when the client software issues an API call to connect to the content server. The DMCL on the client device creates a thread (Windows) or process (Unix) representing the session in client memory, and likewise, the content server creates a thread/process representing the session on the server. A session created on the client device typically does not have a timeout associated with it, but will remain in client memory until disconnected. A session on the server, however, will usually have a timeout set in the configuration file.

There are limits set in configuration files for the number of sessions that may be handled at one time, and these limits are usually different for the client (fewer sessions) and the server (more sessions). In the client, the DMCL layer defines a key [max_session_count] in the configuration file [dmcl.ini] that controls the number of sessions which may be active on the client at one time. The server also includes a defined key [concurrent_sessions] in its configuration file [server.ini] that controls the number of sessions that may be active on the server.

Thus, there may be multiple sessions running including sessions wherein a reader S1 threads data from a shared resource and a writer S2 threads data to the same shared resource. In a system allowing such "concurrent" sessions, operations of readers and writers must be prevented from interfering with each other. For example, in a conventional session management technique, a "mutex" may be required to serialize the operations of readers and writers. A mutex is a program module with software code that dictates mutual exclusion and serialization of sessions that are attempting to access a shared resource. A shared resource may be any content or service available through the content management service.

Figure 6A:
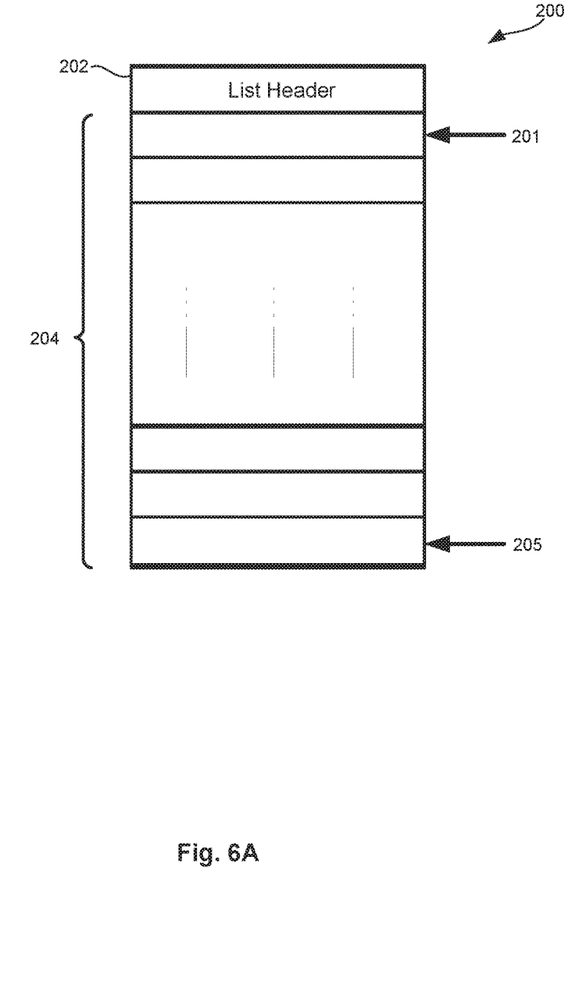
FIG. 6A is a diagram illustrating a linked list as a shared resource.

In one embodiment, the shared resource is a linked list having a fixed header, where members of the list are maintained in a queue having a pre-determined size. For example, in FIG. 6A, a linked list 200 has a defined size of 100 items (a default setting that may be configured). The fixed header 202 is stored in a memory location, and a queue 204 is defined as a list having 100 memory locations (or the number of locations that have been configured) with a top pointer 201 pointing to the location at the top of the list (the oldest entry) and a bottom pointer 205 pointing to the location at the bottom of the list (the newest entry).

Figure 6B:
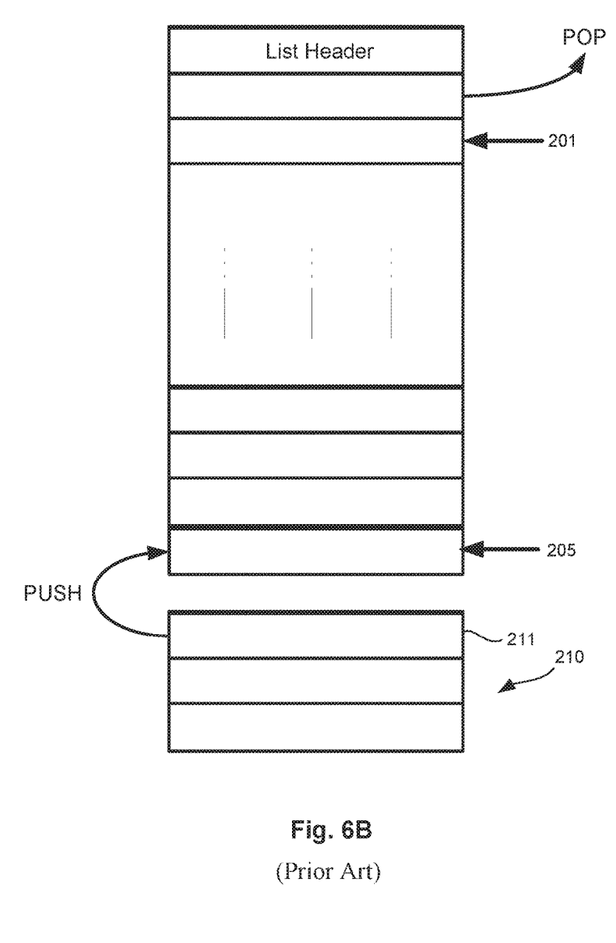
FIG. 6B is a diagram illustrating push and pop operations on the linked list of FIG. 6A.

In a conventional write session, as shown in FIG. 6B, a new data entry is temporarily stored in location 211 of buffer 210 and then is pushed into the bottom of queue 204. Pointer 201 points to the oldest entry at the top of queue 204, and this data entry is popped out of the queue and deleted. Finally, after the data is popped out of the queue 204, pointer 201 is moved down the queue to the next top location, and pointer 205 is moved down the queue to the next bottom location.

In a conventional write session where concurrent access is requested by one or more additional users, a mutex serializes the requests and handles each in order after the prior request has been completed.

4. Concurrent Access Control

In a multiuser environment, the document management system must have techniques to control concurrent access to data objects stored in the repository. As noted above, one known solution is to provide a mutex which (i) locks the shared resource from further access attempts, and then (ii) prioritizes access requests by readers and writers for concurrent access to the shared resource, for example, by placing requests in a wait list in the order received (or by some other priority scheme) and then handling them in order. Obviously, this causes delay, and may even cause deadlock or livelock in an active system.

A typical scenario for a concurrent session involves a write session S2 issuing SQL statements to write data to the database and one or more read sessions that seek to read data from the database. For example, in a common troubleshooting technique, the write session S2 performs a "trace" to identify and analyze the list of SQL statements issued against the database. Likewise, a read session S1 can request a list of the last SQL statements from all sessions.

In one embodiment, concurrent access techniques are improved by providing a logical test that, when met, indicates a concurrent request by another user to access data that stops an active write session from popping any data out of the list for that resource. The logical test may be implemented by defining a flag if only one reader is allowed concurrent access or a counter if multiple readers are allowed concurrent access. A write session checks the flag or counter prior to popping data from the queue.

In one embodiment, the method of the write session that pushes and pops data into and out of the queue includes a flag that may be set when a reader has requested access to the shared resource. No data may be popped from the queue while the flag is set. The flag will be reset when the concurrent user releases the resource, and data may be popped when the flag is not set.

In another embodiment for a system allowing multiple concurrent readers, a counter is provided that may be incremented for each such reader that requests access to that shared resource. When the counter is not zero, then the write session knows that one or more readers is sharing access to the shared resource, and the writer will be prevented from popping any data off of the list. When the counter is zero, the write session can pop data off the queue.

Figure 7:
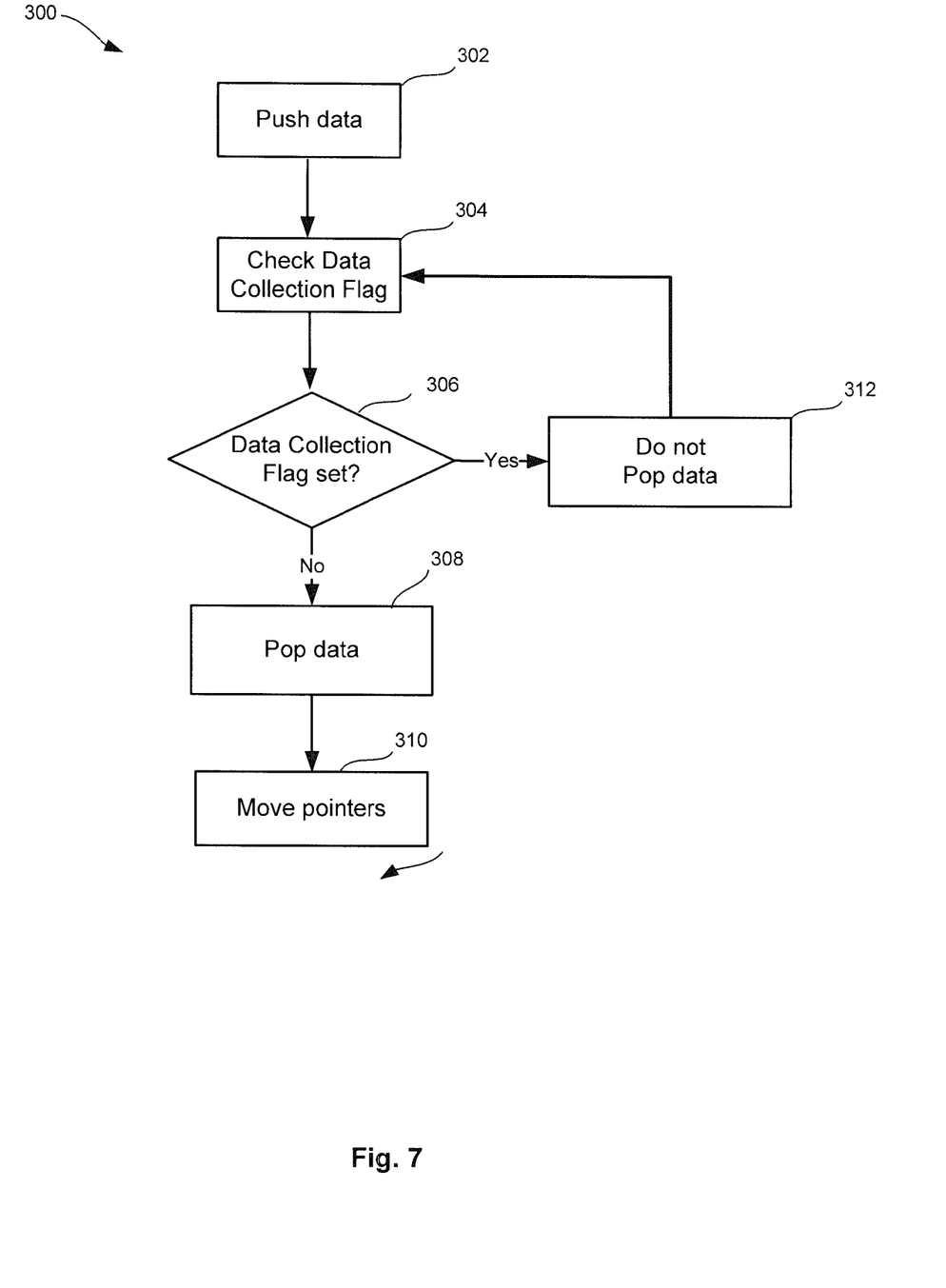
FIG. 7 is a flow chart illustrating a process for providing concurrent access to a shared resource.

FIG. 7 illustrates a process 300 for controlling concurrent access during a write session. In step 302, the write session pushes data into the queue 200. This data is appended to the queue, and as a result, the list now exceeds the configured size of the queue, e.g., there are 101 data entries after a single data item is pushed into the queue.

In step 304, the session checks the state of the data collection flag. The data collection flag can have two values: TRUE (set) or FALSE (not set). The data collection flag will be set to TRUE whenever a read session requests a shared resource, and will be reset to FALSE when the read session releases the shared resource.

In step 306, if the data collection flag is not set, i.e., the flag has a value of FALSE, then the write session can proceed to pop the oldest data item from the queue in step 308, and then adjust the pointers in step 310 to point to the new first item (moved to top of list) and the new last item (added by write session).

If instead the data collection flag is set to TRUE at step 306, then in step 312, data cannot be popped from the queue. The process loops back to steps 304 and 306 until the flag has been reset, at which point the data can be popped from the queue and the pointers reset.

Figure 8:
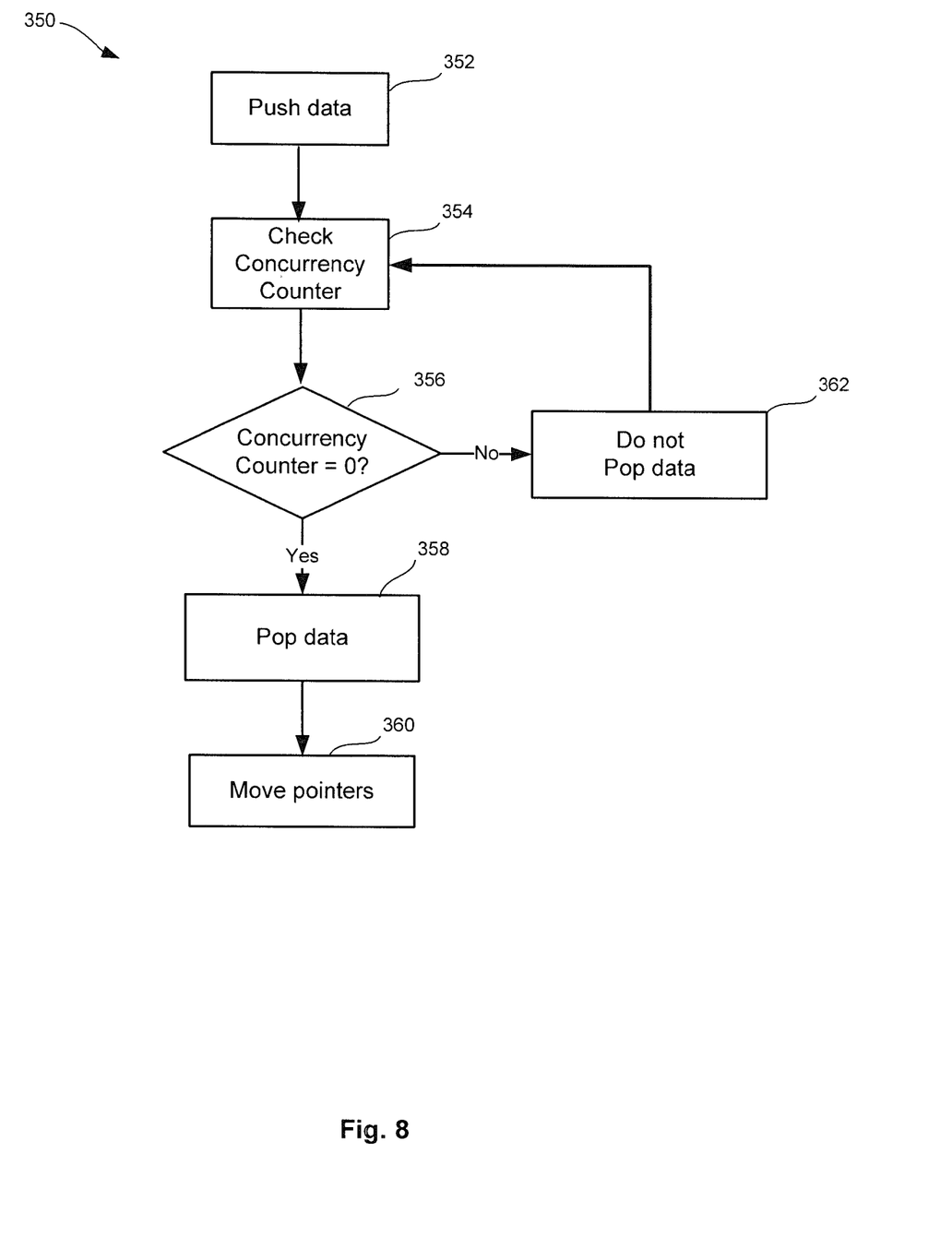
FIG. 8 is a flow chart illustrating another process for providing concurrent access to a shared resource.

FIG. 8 illustrates an alternative process 350 for controlling concurrent access of multiple read sessions during a write session. In step 352, the write session pushes data into the queue 200. In step 354, the session checks the state of the concurrency counter. The concurrency counter is incremented whenever a read session requests a shared resource, and is decremented whenever the read session releases the shared resource.

In step 356, if the concurrency counter is equal to zero, there are no concurrent read sessions, and the write session can proceed to pop the oldest data item from the queue in step 358, and then adjust the pointers in step 360 to point to the new items.

If instead the concurrency counter is not equal to zero in step 356, then in step 362, data cannot be popped from the queue. The process loops back to steps 354 and 356 until the concurrency counter is equal to zero, at which point data can be popped from the queue and the pointers reset.

We claim:

1. A method for controlling concurrent access to a shared resource in a distributed computing environment, comprising:
    receiving a first access request to write first data, during a first session associated with a first user, to a shared resource having a fixed size, the first data including a structured query language (SQL) statement to write data to the shared resource, the database including the shared resource represented as a linked list;
    based on receipt of the first access request, checking a status indicator counter to determine if any concurrent session associated with a second user is reading any data from the shared resource by requesting a list of SQL statements from the shared resource, the status indicator:
    i) being incremented each time a new read concurrent session is initiated,
    ii) being decremented each time an existing read concurrent session is released,
    iii) having a value of zero when no read concurrent session is running, and
    iv) showing that no concurrent session is reading any data from the shared resource when the list of SQL statements issued to the shared resource has been sent to the second user;
    based on a determination that no concurrent session is reading any data from the shared resource and that writing the first data to the shared resource will exceed the fixed size of the shared resource, removing oldest data from the shared resource and writing the first data as newest data of the shared resource; and
    based on a determination that any data from the shared resource is being read during any concurrent session, preventing the oldest data in the shared resource from being removed until the status indicator indicates that no concurrent session is reading any data from the shared resource, the shared resource further including stored third data that is younger than the second data and older than the first data.

2. The method of claim 1, wherein the status indicator is a Boolean flag that is set to TRUE when the at least one concurrent session is running and set to FALSE when the at least one concurrent session is not running.

3. The method of claim 1, wherein the status indicator is a counter that is incremented each time a new read concurrent session is initiated and decremented each time an existing read concurrent session is released, wherein no read concurrent session is running when a value of the counter is zero.

4. The method of claim 1, wherein the first data comprises a structured query language (SQL) statement to write data to the shared resource, the database including the shared resource.

5. The method of claim 1, wherein any concurrent session reading any data from the shared resource is requesting a list of structured query language (SQL) statements issued to the shared resource, the status indicator showing that no concurrent session is reading any data from the shared resource when the list of SQL statements issued to the shared resource has been sent to the second user.

6. A non-transitory computer-readable storage medium encoded with instructions, which when executed, cause one or more processors to:
    receive a first access request to write first data, during a first session associated with a first user to a shared resource having a fixed size, the shared resource being represented as a linked list;

based on receipt of the first access request, check a status indicator counter to determine if any concurrent session associated with a second user is reading any data from the shared resource by requesting a list of SQL statements from the shared resource, the status indicator:
i) being incremented each time a new read concurrent session is initiated,
ii) being decremented each time an existing read concurrent session is released,
iii) having a value of zero when no read concurrent session is running, and
iv) showing that no concurrent session is reading any data from the shared resource when the list of SQL statements issued to the shared resource has been sent to the second user;

based on a determination that no concurrent session is reading any data from the shared resource and that writing the first data to the shared resource will exceed the fixed size of the shared resource, remove oldest data from the shared resource and write the first data as newest data of the shared resource; and based on a determination that any data from the shared resource is being read during any concurrent session, prevent the oldest data in the shared resource from being removed until the status indicator indicates that no concurrent session is reading any data from the shared resource, the shared resource further including stored third data that is younger than the second data and older than the first data.

7. The computer-readable medium of claim 6, wherein the status indicator is defined as a Boolean flag that is set to TRUE when the at least one concurrent session is running and set to FALSE when the at least one concurrent session is not running.

8. A content management system for providing controlled access to a shared resource in a distributed computing environment, comprising:
a repository having access and storage operations controlled by at least one content server; and
the content server including a content management framework, for integrated operation with the repository, and further comprising a processor-based application, which when executed by at least one computer associated with the content server, will cause the processor to:

receive a first access request to write first data, during a first session associated with a first user, to a shared resource having a fixed size in the data repository, the first data including a structured query language (SQL) statement to write data to the shared resource, the database including the shared resource represented as a linked list;

based on receipt of the first access request, check a status indicator counter to determine if any concurrent session associated with a second user by requesting a list of SQL statements from the shared resource, the status indicator:
i) being incremented each time a new read concurrent session is initiated,
ii) being decremented each time an existing read concurrent session is released,
iii) having a value of zero when no read concurrent session is running, and
iv) showing that no concurrent session is reading any data from the shared resource when the list of SQL statements issued to the shared resource has been sent to the second user;

based on a determination that no concurrent session is reading any data from the shared resource in the repository and that writing the first data to the shared resource will exceed the fixed size of the shared resource, request removal of oldest data from the shared resource and request that the first data be written to the repository as newest data of the shared resource, the writing inserting the first data into the linked list, the writing and removing maintaining the fixed size of the shared resource; and based on a determination that any data from the shared resource in the repository is being read during any concurrent session, generate a command to prevent the oldest data in the shared resource from being removed until the status indicator indicates that no concurrent session is reading any data from the shared resource in the repository, the shared resource further including stored third data that is younger than the second data and older than the first data.

9. The content management system of claim 8, wherein the status indicator is a Boolean flag that is set to TRUE when the at least one concurrent session is running and set to FALSE when the at least one concurrent session is not running.

* * * * *